(12) United States Patent
Quah et al.

(10) Patent No.: US 8,325,707 B2
(45) Date of Patent: Dec. 4, 2012

(54) SESSION INITIATION FROM APPLICATION SERVERS IN AN IP MULTIMEDIA SUBSYSTEM

(75) Inventors: Elaine Quah, Kanata (CA); Michael Leeder, Stittsville (CA); Bryn Rahm, Kanata (CA)

(73) Assignee: Rockstar Consortium US LP, Richardson, TX (US)

( * ) Notice: Subject to any disclaimer, the term of this patent is extended or adjusted under 35 U.S.C. 154(b) by 1872 days.

(21) Appl. No.: 11/408,850

(22) Filed: Apr. 21, 2006

(65) Prior Publication Data

US 2006/0242310 A1 Oct. 26, 2006

Related U.S. Application Data

(60) Provisional application No. 60/674,058, filed on Apr. 22, 2005.

(51) Int. Cl.
*H04L 12/66* (2006.01)
(52) U.S. Cl. ......... 370/352; 370/384; 370/385; 709/229
(58) Field of Classification Search ........................ None
See application file for complete search history.

(56) References Cited

U.S. PATENT DOCUMENTS

| | | | |
|---|---|---|---|
| 2004/0187021 A1 | 9/2004 | Rasanen | |
| 2004/0242227 A1 | 12/2004 | Huotari et al. | |
| 2005/0213606 A1* | 9/2005 | Huang et al. | 370/467 |

FOREIGN PATENT DOCUMENTS

| | | |
|---|---|---|
| WO | 03/030429 A2 | 4/2003 |
| WO | 2005/027459 A1 | 3/2005 |

OTHER PUBLICATIONS

International Search Report for PCT/IB2006/00965 mailed Sep. 20, 2006.

* cited by examiner

*Primary Examiner* — Asad Nawaz
*Assistant Examiner* — Justin N. Mullen
(74) *Attorney, Agent, or Firm* — Withrow & Terranova, PLLC

(57) ABSTRACT

The present invention provides a technique where application servers can initiate sessions within the IMS network by initially sending session initiation messages to the I-CSCF. By routing the session initiation messages to the I-CSCF, the application servers need not directly access the HSSs in order to initiate sessions. Upon receiving a session initiation message from an application server, the I-CSCF may access the HSS to identify an S-CSCF to use for session control and then route the session initiation message to that S-CSCF. The S-CSCF may then access the same or different HSS to determine how to further route the session initiation message to establish the session. The session initiation message may be routed toward other S-CSCFs en route to the appropriate user elements. The session may be a session established between user elements or between the application server and a user element.

20 Claims, 13 Drawing Sheets

SESSION INITIATION FROM APPLICATION SERVERS IN AN IP MULTIMEDIA SUBSYSTEM

This application claims the benefit of U.S. provisional patent application Ser. No. 60/674,058, which was filed in the U.S. Patent and Trademark Office on Apr. 22, 2005.

FIELD OF THE INVENTION

The present invention relates to telecommunications, and in particular to a technique to allow application servers to initiate sessions in an Internet Protocol multimedia subsystem.

BACKGROUND OF THE INVENTION

The Internet Protocol (IP) multimedia subsystem (IMS) is a standardized architecture for providing multimedia services over any network supporting packet-based communications. IMS can also be extended to circuit-switched networks through appropriate gateways. IMS is configured to provide a centralized service control system across different network architectures. As such, IMS can support multimedia services over any type of access network. These access networks may support fixed or wireless communications, as long as there is a mechanism to support packet-based communications. IMS runs over the standard IP. IMS generally uses VoIP technology based on a third generation partnership project (3GPP) implementation of the Session Initiation Protocol (SIP). With IMS, services can be provided to subscribers irrespective of their location, access technology, and terminal.

With reference to FIG. 1, an exemplary IMS architecture 10 is illustrated. In this example, user elements (UE) 12 are capable of communicating with each other via their respective access networks 14. For a given call or session between the user elements 12, the IMS architecture 10 will provide the requisite signaling to establish and control the call or session. For conciseness and readability, calls or sessions are collectively referred to as sessions. Further, the media delivered in the sessions may be data, audio, video, or voice. The IMS architecture 10 employs several call/session control functions (CSCFs), which are implemented as SIP servers or proxies. These CSCFs are used to process SIP signaling messages, which facilitate the signaling required for establishing and controlling the sessions.

As illustrated, session signaling may be provided in various networks, such as a visited network 18, a home network 16, and a called network 20. The visited network 18 represents the network currently supporting a roaming user element 12 of user A, who is the calling party originating a session. The home network 16 is the home services network for the user element 12 of user A, and the called network 20 is a visited or home network for the user element 12 of user B, who is the called party that is terminating the session.

Each of these networks may include CSCFs. In the IMS architecture 10, the CSCFs are implemented having three primary functions: a proxy CSCF (P-CSCF) 22, an interrogating CSCF (I-CSCF) 24, and a serving CSCF (S-CSCF) 26. The P-CSCF 22 is a SIP proxy that is generally the first point of contact for a user element 12, and can be located in a visited network 18 or home network 16. As illustrated, the P-CSCF 22 in the visited network 18 is associated with user element 12 of user A. User A's user element 12 may be assigned to the P-CSCF 22 in the visited network 18 during registration. The P-CSCF 22 in the visited network 18 is in the signaling path of all signaling messages for the session and will establish a security association with the User A's user element 12. The P-CSCF 22 in the visited network 18 may also compress and decompress SIP messages in an effort to reduce signaling overhead or increase response times over slow radio links. Further, the P-CSCF 22 may map the user ID associated with the user element 12 to an appropriate I-CSCF 24.

To initiate the session with user B's user element 12, user A's user element 12 will send to the P-CSCF 22 in the visited network 18 a session initiation message identifying user B's user element as the called party. The P-CSCF 22 in the visited network will route the call to the I-CSCF 24 in the home network 16. The I-CSCF 24 is also a SIP proxy and is generally located at the edge of an administrative domain, which is the home service network in this example. The IP address of the I-CSCF 24 is published in the domain name service of the administrative domain, such that the P-CSCF 22 in the visited network 18, as well as any other entities, can locate the I-CSCF 24 and use it as a point of entry for all signaling messages for the administrative domain.

Upon receipt of the session initiation message from the P-CSCF 22 in the visited network 18, the I-CSCF 24 may access a home subscriber server (HSS) 28 to identify the S-CSCF 26 to use for session control. The HSS 28 is essentially a master database that supports various network entities that are involved in establishing and controlling sessions. The HSS 28 contains user profiles and other related subscription information, assists in authentication and authorization of a user, and can provide information about the physical location of a user by keeping track of the location of the user element 12.

The S-CSCF 26 is generally the central signaling node in the IMS architecture 10 for the user element 12 of user A. Upon receipt of the session initiation message from the I-CSCF 26 in the home network 16. The S-CSCF 26 in the home network will then route the session initiation message to the I-CSCF 24 in the called network 20, which is serving user B's user element 12. The I-CSCF 24 in the home network 16 will may access another HSS (not shown) to determine the location of user B's user element 12 and identify the S-CSCF 26 in the called network 20 to use for session control. Upon receipt of the session initiation message from the I-CSCF 24 in the called network 20, the S-CSCF 26 in the called network 20 will route the call to the P-CSCF 22, which is serving user B's user element 12 in the called network. The P-CSCF 22 in the called network 20 will then route the session initiation message to the user element 22.

The S-CSCFs 26 used for the routing the session initiation message remain in the signaling path for subsequent signaling messages for the session supported between the user elements 12, and can inspect every signaling message traveling in either direction. Similarly, the P-CSCF's 22 and I-CSCFs 24 invoked during initial routing may remain in the signaling path wherein all signaling messages exchanged between the user element 12 for a session are also passed through these CSCFs. The media session is provided over a transport plane 30 and session control is provided in the control plane 32, which is comprised of the P-CSCF 22, I-CSCF 24, and S-CSCF 26.

Based on inspecting the signaling messages, the S-CSCFs 26 can determine if and when to invoke multimedia services for the user elements 12 or associated sessions. With reference to FIG. 2, the multimedia services are provided in a service plane 34, which is generally made up of numerous application servers 36 capable of providing one or more multimedia services. To provide a multimedia service, the S-CSCF 26 will identify the appropriate multimedia service and forward signaling messages to the application server 36 chosen to provide the multimedia service. The application server 36 will provide the multimedia service by effectively processing the signaling message and returning the processed signaling message back to the S-CSCF 26, if necessary, which will forward the signaling message in a desired fashion. As illustrated, the application server 36 providing a selected multimedia service may also remain in the signaling path.

The evolution of IMS has enabled application servers 36 to initiate sessions directly with a user element 12 or between user elements 12. As illustrated in FIG. 3, an application server 36 may be configured to initiate a video session with user B's user element 12 wherein streaming video is provided to user B's user element 12 from the application server 36. To initiate sessions from an application server 36, developers reconfigured the applications servers 36 and the HSSs 28 to be able to interact with one another, such that the application servers 36 can directly access the HSSs 28 to identify the S-CSCF 26 in the home network 16. Once the application server 36 is aware of the S-CSCF 26 in the home network 16 to use for session control, the session is routed to the S-CSCF 26 in the home network 16. The S-CSCF 26 in the home network 16 will then route the session to the I-CSCF 24 in the called network 20. The I-CSCF 24 will route the session to the S-CSCF 26 in the called network 20. Upon reaching the S-CSCF 26 in the called network 20, the session is routed to user B's user element 12 via the P-CSCF 22 in the called network 20. The application server 36 and user B's user element 12 may exchange messaging over the signaling path to establish the media session.

As noted, the application server 36 may operate in a similar fashion to establish a session between the user elements 12. Regardless of whether the application server 36 provides a session to a user element 12 or initiates and controls a session between user elements 12, the application server 36 has to access the HSS 28 to identify an S-CSCF 26 to invoke for session control. Direct access to the HSS 28 by an application server 36 is undesirable, because the HSS 28 stores critical information regarding the entire IMS network and the nodes and user elements supported thereby. Only secure and authorized application servers 36 can be allowed to access the HSS 28. Generally, application servers 36 are authorized and maintained within the confines of the IMS network. Since one of IMS's goals is to provide new and enhanced services to users, the need for significant security measures has a limiting effect on the proliferation of services and application servers 36 that are available to the IMS users.

For those application servers 36 that are authorized to access the HSSs 28, there is a need for additional protocols simply to communicate with the HSSs 28. Many equipment providers are leery of incorporating the additional protocols in the application servers 36 to facilitate HSS access. The result is a further limiting of the proliferation of services and application servers 36 available to user elements 12.

Accordingly, there is a need for a technique to initiate sessions from application servers 36 without requiring the application servers 36 to interact with the HSSs 28. There is also a need to allow the application servers 36 to initiate such sessions using standard protocols used to interact with S-CSCFs 26. There is a further need to allow non-IMS application servers 36 to gain access to the IMS and initiate sessions in a secure yet efficient fashion.

SUMMARY OF THE INVENTION

The present invention provides a technique where application servers can initiate sessions within the IMS network by initially sending session initiation messages to the I-CSCF. By routing the session initiation messages to the I-CSCF, the application servers need not access the HSSs in order to initiate sessions. Upon receiving a session initiation message from an application server, the I-CSCF may access the HSS to identify an S-CSCF to use for session control and then route the session initiation message to that S-CSCF. The S-CSCF may then access the same or different HSS to determine how to further route the session initiation message to establish the session. The session initiation message may be routed toward other S-CSCFs en route to the appropriate user elements. The session may be a session established between user elements or between the application server and a user element.

The I-CSCF is configured to facilitate call signaling with the application servers and locate S-CSCFs 26 to use for session control. As such, a service control interface is provided between the I-CSCFs and the application servers. The service control interface between the I-CSCFs and the HSSs is used to allow the I-CSCF to access the HSS to identify an S-CSCF to which the session initiation message is routed.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention provides a technique where application servers 36 initiate sessions within the IMS network by initially sending session initiation messages to the I-CSCF 24. By routing the session initiation messages to the I-CSCF 24, the application servers 36 need not access the HSSs 28 in order to initiate sessions. Upon receiving a session initiation message from an application server 36, the I-CSCF 24 may access the HSS 28 to identify an S-CSCF 26 to use for session control and then route the session initiation message to that S-CSCF 26. The S-CSCF 26 may then access the same or different HSS 28 to determine how to further route the session initiation message to establish the session. The session initiation message may be routed toward other S-CSCFs 26 en route to the appropriate user elements 12. The session may be a session established between user elements 12 or between the application server 36 and a user element 12.

The I-CSCF 24 is configured to facilitate call signaling between with the application servers 36 and locate S-CSCFs 26 to use for session control. As such, a service control interface is provided between the I-CSCFs 24 and the application servers 36. The service control interface between the I-CSCFs 24 and the HSSs 28 is used to allow the I-CSCF 24 to access the HSS 28 to identify an S-CSCF 26 to which the session initiation message is routed. The I-CSCFs 24 and the HSSs 28 will be modified accordingly.

Figure 1:
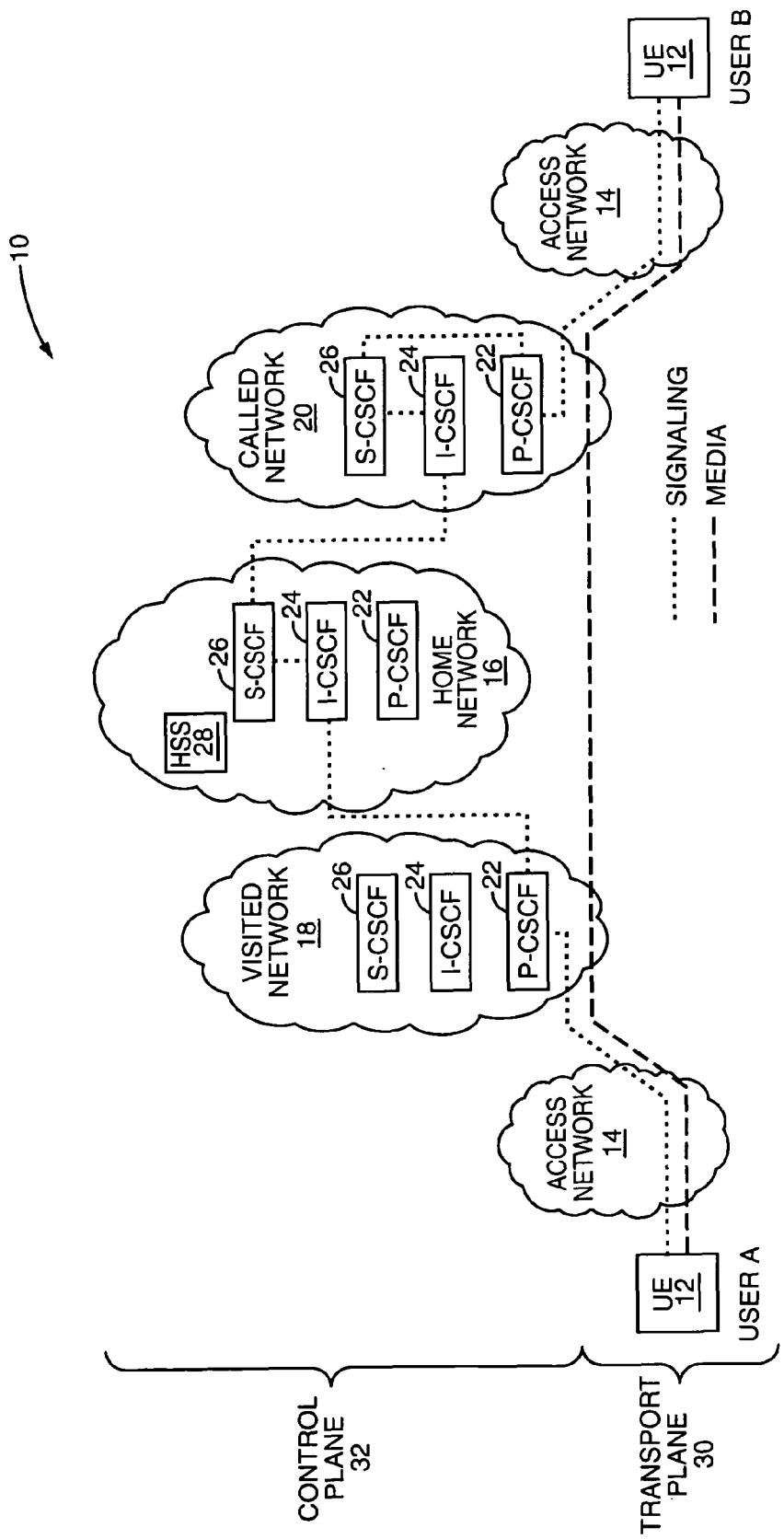
FIG. 1 is an IP multimedia subsystem illustrating the signaling and media paths for a session between two user elements according to the prior art.
Figure 2:
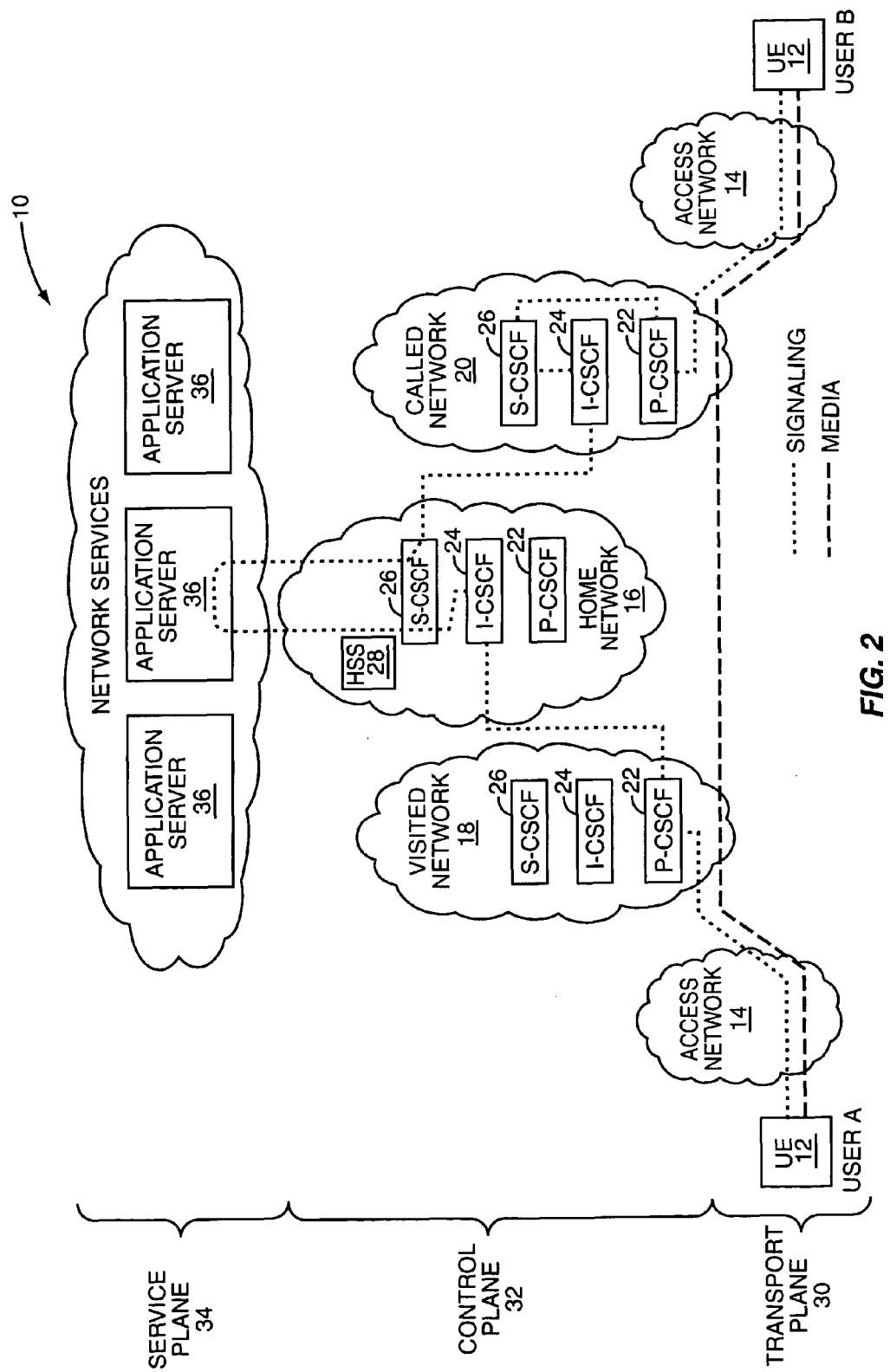
FIG. 2 is an IP multimedia subsystem illustrating the signaling and media paths for a session between two user elements according to the prior art, wherein the services of an application server are invoked.
Figure 3:
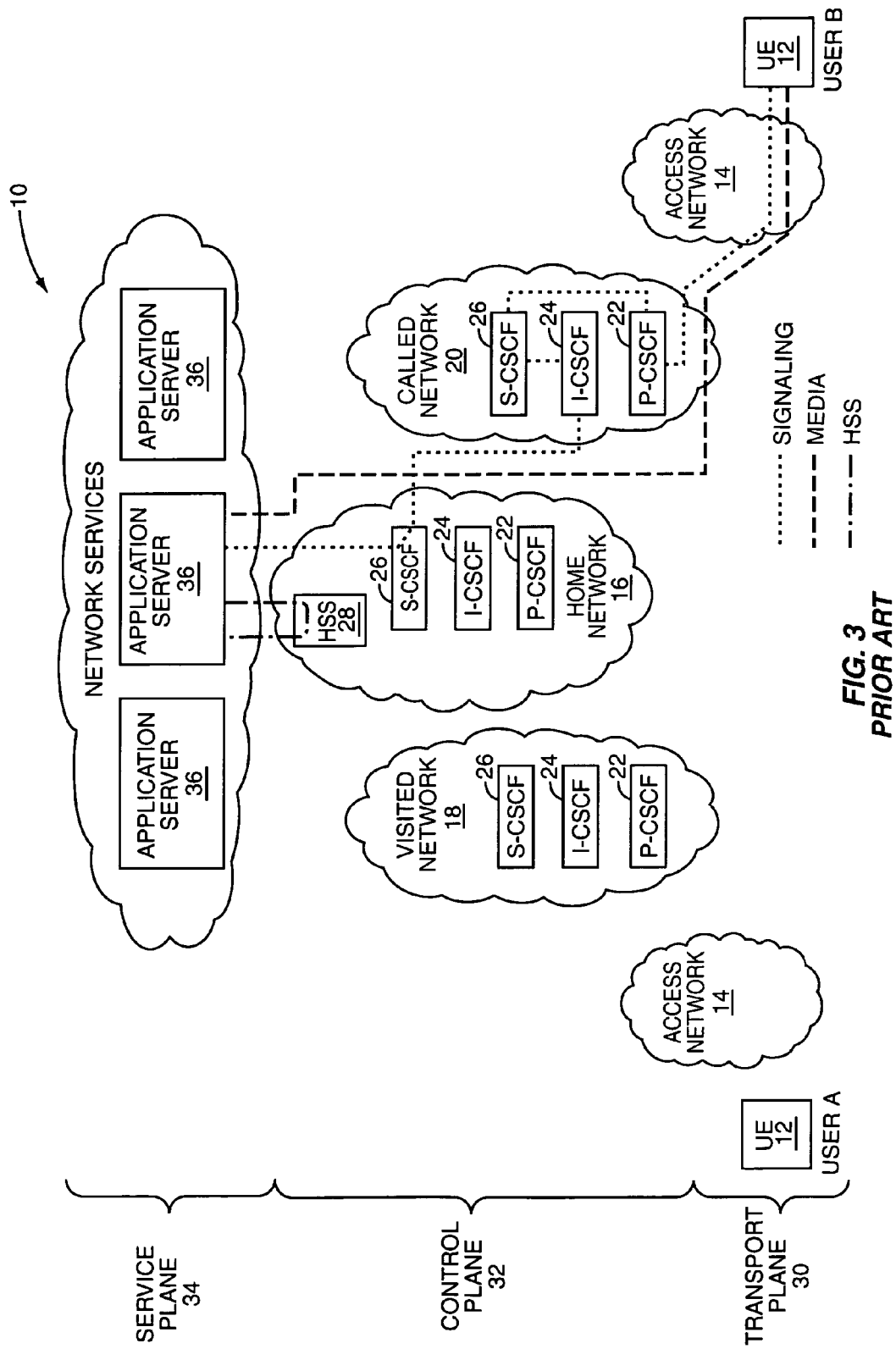
FIG. 3 is an IP multimedia subsystem illustrating the signaling and media paths for a session between an application server and a user element according to the prior art, wherein the session is initiated by the application server.
Figure 4A:
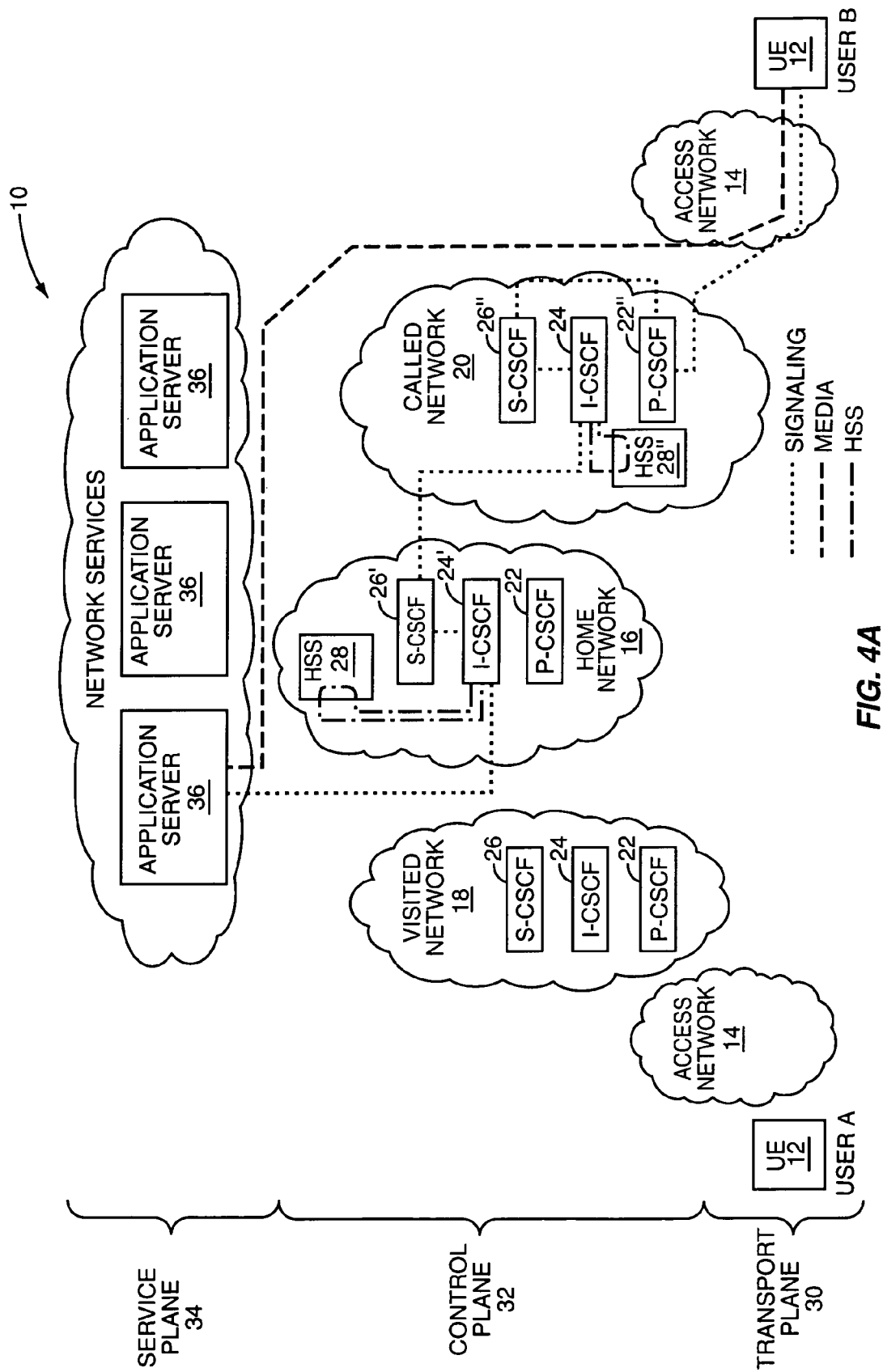
FIG. 4A is an IP multimedia subsystem illustrating the signaling and media paths for a session between an application server and a user element according to a first embodiment of the present invention, wherein the session is initiated by the application server.

As illustrated in FIG. 4A, an application server 36 may be configured to initiate a session with user B's user element 12, wherein a session is established between user B's user element 12 and the application server 36. Instead of accessing the HSS 28, the application server 36 will create a session initiation message where the application server 36 appears as an originating user agent. In the session initiation message, the application server 36 will insert a route header, which points to an appropriate I-CSCF 24'. The route header will identify the call signaling entities in the signaling path, and is modified as call signaling entities are added or removed from the call signaling path. In this example, the session initiation message will indicate that the application server 36 is the originator of the session.

Once the session initiation message is created, the application server 36 will route the session initiation message to the I-CSCF 24'. The I-CSCF 24' will access the HSS 28 to obtain the originating S-CSCF 26', which is associated with the "originator" of the session initiation message. The S-CSCF 26' will identify the I-CSCF 24" associated with the called network 20. The session initiation message is then routed to the terminating I-CSCF 24", which will access the HSS 28" to identify the terminating S-CSCF 26" in the called network 20. The terminating I-CSCF 24" will then route the session initiation message to the terminating S-CSCF 26". Upon reaching the S-CSCF 26" in the called network 20, the session initiation message is routed to user B's user element 12 via the P-CSCF 22" in the called network 20. Once the session initiation message is received at user B's user element 12, the signaling path is defined in the route header. The application server 36 and user B's user element 12 may exchange messaging over the signaling path to establish the media session.

Figure 4B:
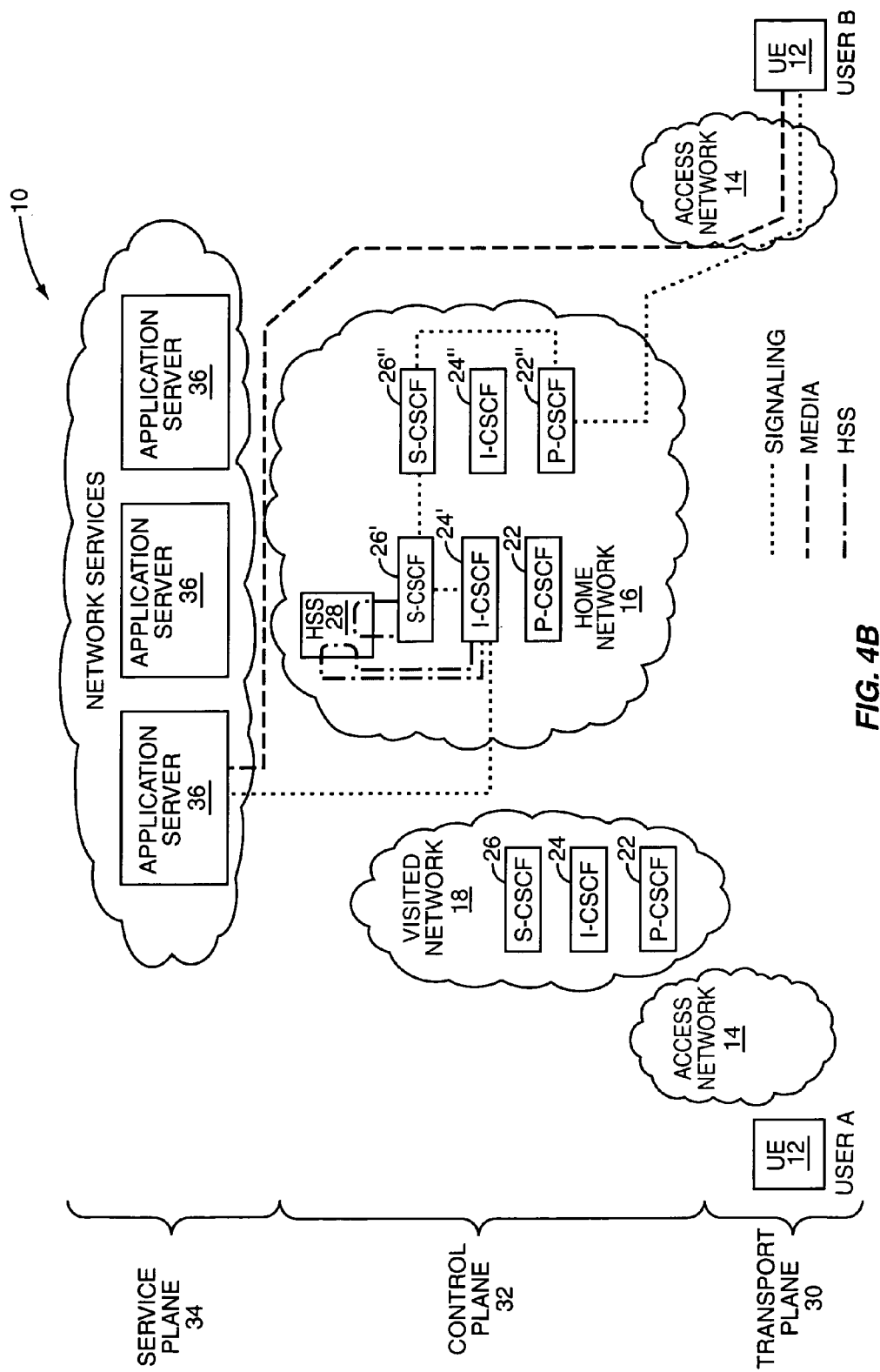
FIG. 4B is an IP multimedia subsystem illustrating the signaling and media paths for a session between an application server and a user element according to a second embodiment of the present invention, wherein the session is initiated by the application server.

As illustrated in FIG. 4B, the called network 20 is the same as the home network 16. Again, the application server 36 may be configured to initiate a session with user B's user element 12, wherein a session is established between user B's user element 12 and the application server 36. Instead of accessing the HSS 28, the application server 36 will create a session initiation message where the application server 36 appears as an originating user agent. In the session initiation message, the application server 36 will insert a route header pointing to an appropriate I-CSCF 24'. The route header will identify the call signaling entities in the signaling path, and is modified as call signaling entities are added or removed from the call signaling path. In this example, the session initiation message will indicate that the application server 36 is the originator of the session.

Once the session initiation message is created, the application server 36 will route the session initiation message to the I-CSCF 24'. The I-CSCF 24' will access the HSS 28 to obtain the originating S-CSCF 26', which is associated with the "originator" of the session initiation message. The session initiation message is then routed to the originating S-CSCF 26', which will access the HSS 28 to identify the terminating S-CSCF 26", which is also located in the home network 16. The originating S-CSCF 26' will then route the session initiation message to the terminating S-CSCF 26". Upon reaching the S-CSCF 26" in the called network 20, the session initiation message is routed to user B's user element 12 via the P-CSCF 22" in the called network 20. Once the session initiation message is received at user B's user element 12, the signaling path is defined in the route header and may include all of the signaling entities in the signaling path. The application server 36 and user B's user element 12 may exchange messaging over the signaling path to establish the media session.

Figure 5A:
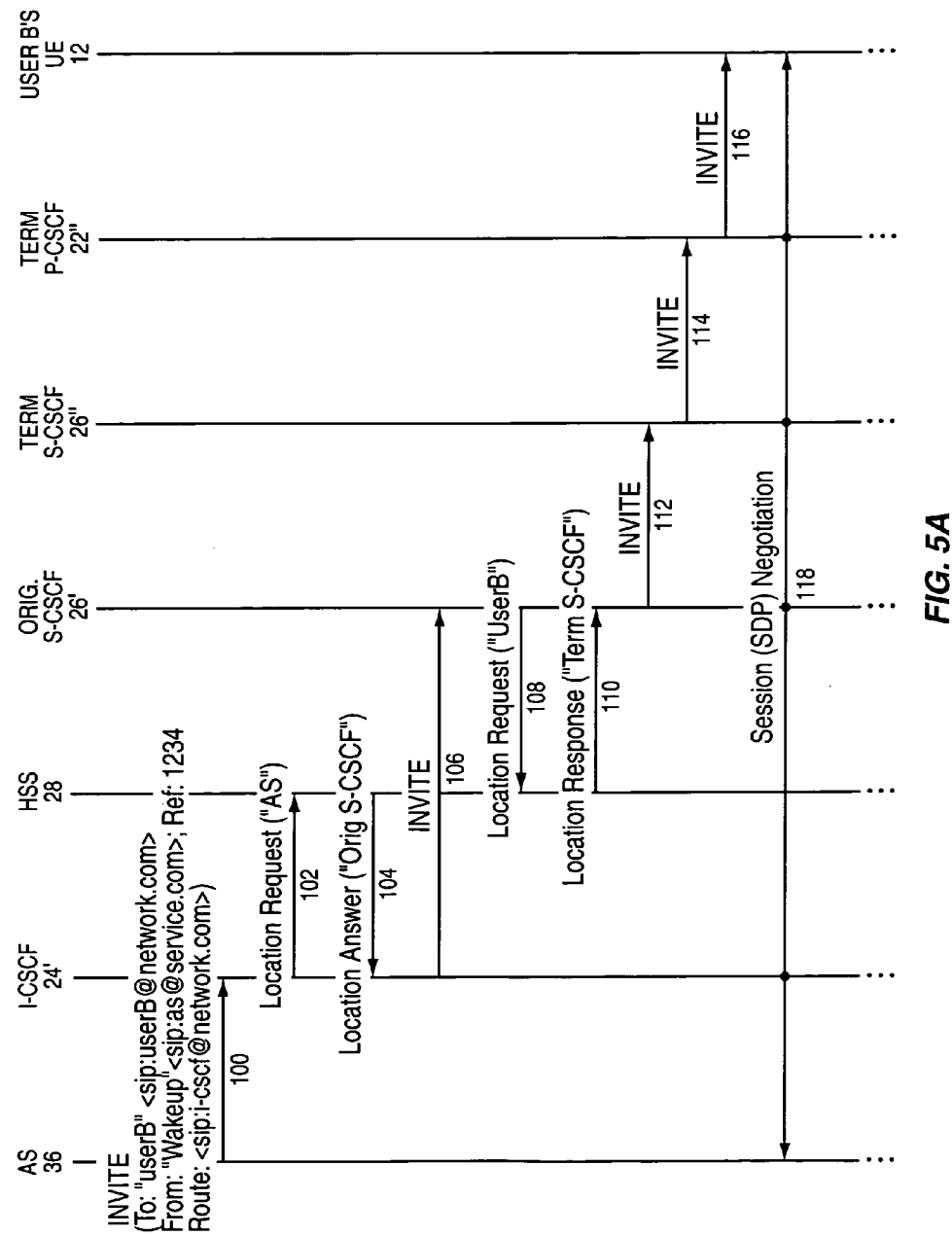
FIGS. 5A and 5B illustrate a communication flow diagram for establishing a session between an application server and a user element according to a first embodiment of the present invention, wherein the session is initiated by the application server.
Figure 5B:
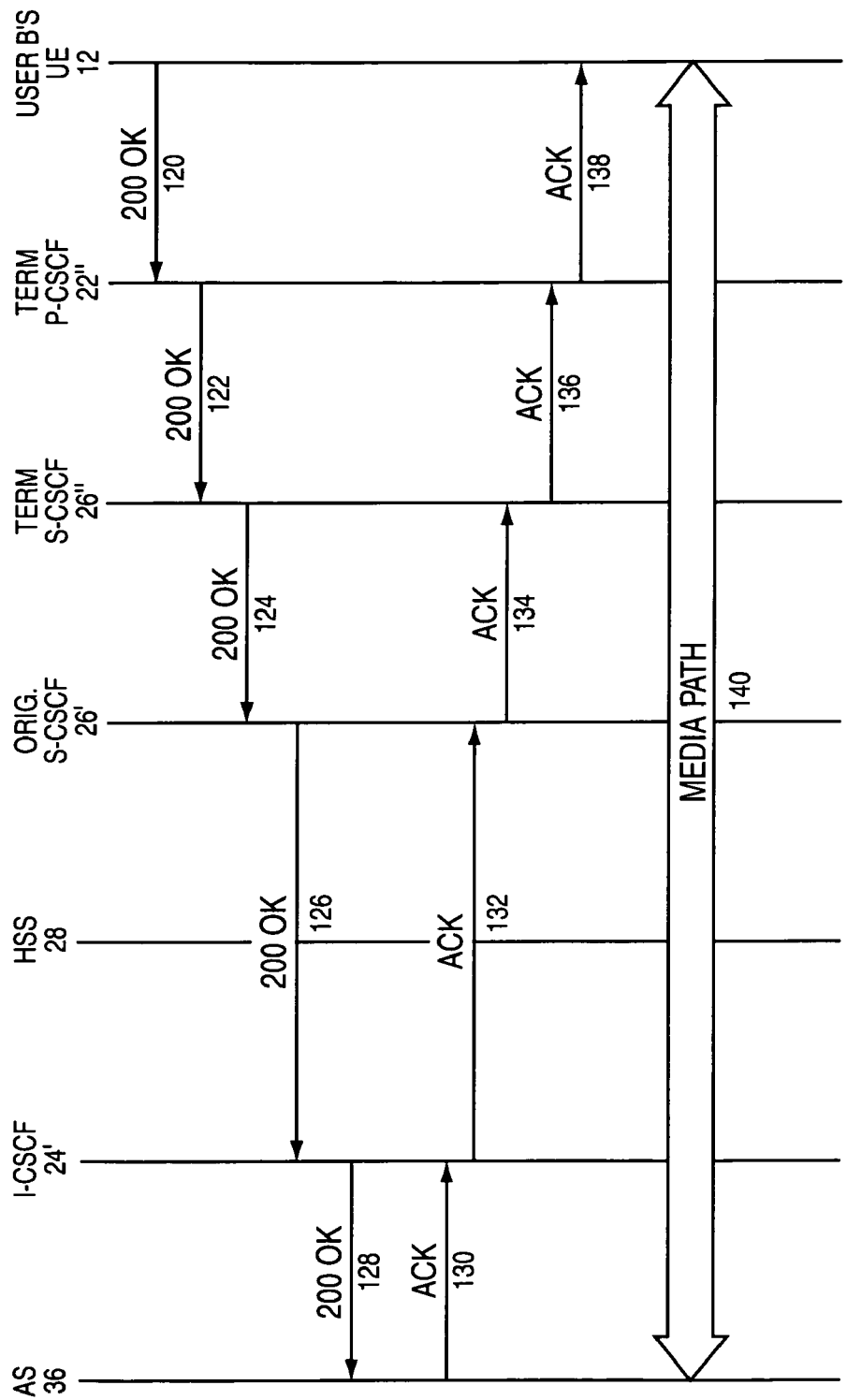

With reference to FIGS. 5A and 5B, a high-level communication flow is provided to illustrate how an application server 36 can initiation of a session with user B's user element 12 as provided in FIG. 4B. Assume the session is a video session provided in cooperation with a wakeup service, which is configured to establish a video session and deliver video to user B's user element 12 at a defined time. For this example, SIP is used for session signaling.

At the defined time, the application server 36 will trigger initiation of a video session with user B's user element 12. As such, the application server 36 will create a session initiation message in the form of a SIP Invite. The Invite identifies addresses of the originating element, the terminating endpoint, and the I-CSCF 24' to which the Invite should be directed. The originating element address corresponds to the address of the application server 36, "Wakeup" <sip: as@network.com>, and is provided in the "from" field. The terminating endpoint address corresponds to the address of user B's user element 12, "userB" <sip: userB@network.com>, and is generally provided in the "request URI" field. The I-CSCF's address, <sip:i-cscf@network.com>, is placed in the route header and is illustrated in the "route" field. The Invite may also include a reference number, 1234, for uniquely identifying the session.

Once created, the Invite is sent to the I-CSCF 24' (step 100), which will send a Location Request to the HSS 28 to identify the originating S-CSCF 26' associated with the application server 36, to which the Invite should be routed (step 102). The HSS 28 will respond with a Location Answer, which identifies the originating S-CSCF 26' (step 104). The I-CSCF 24' will send the Invite to the originating S-CSCF 26' (step 106), which will send a Location Request to the HSS 28 to identify the terminating S-CSCF 26', which serves user B's user element 12 (step 108). The HSS 28 will respond with a Location Answer, which identifies the terminating S-CSCF 26" (step 110). The originating S-CSCF 26' will invoke any desired application services from other application servers 36, add itself to the route header, and send the Invite to the terminating S-CSCF 26" (step 112).

The terminating S-CSCF 26' will invoke any desired application services from other application servers 36, add itself to the route header, and send the Invite to the P-CSCF 22" currently supporting user B's user element 12 (step 114). The P-CSCF 22" will send the Invite to user B's user element 12 (step 116). At this point, the session is presented to user B's user element 12 and standard session negotiation messages are exchanged along the signaling path between the application server 36 and user B's user element 12 (step 118). Session negotiation may be employed in the Session Description Protocol (SDP) of the SIP messages where communication parameters for the session message are exchanged between the application server 36 and user B's user element 12 via the signaling path.

After session negotiation, user B's user element 12 will send a 200 OK message to the P-CSCF 22" (step 120), which will send the 200 OK to the terminating S-CSCF 26" (step 122). The terminating S-CSCF 26" will send the 200 OK to the originating S-CSCF 26' (step 124). The originating S-CSCF 26' will send the 200 OK to the I-CSCF 24' (step 126), which will send the 200 OK to the application server 36 (step 128). In response, the application server 36 will send an acknowledgement (ACK) toward user B's user element 12 along the signaling path. The acknowledgement is forward through the I-CSCF 24', originating S-CSCF 26', terminating S-CSCF 26", and P-CSCF 22" to user B's user element 12 (steps 130 through 138). At this point, a media path for the video session is established between the application server 36 and user B's user element 12, and video content may be streamed to user B's user element 12 to the application server 36 (step 140).

Figure 6:
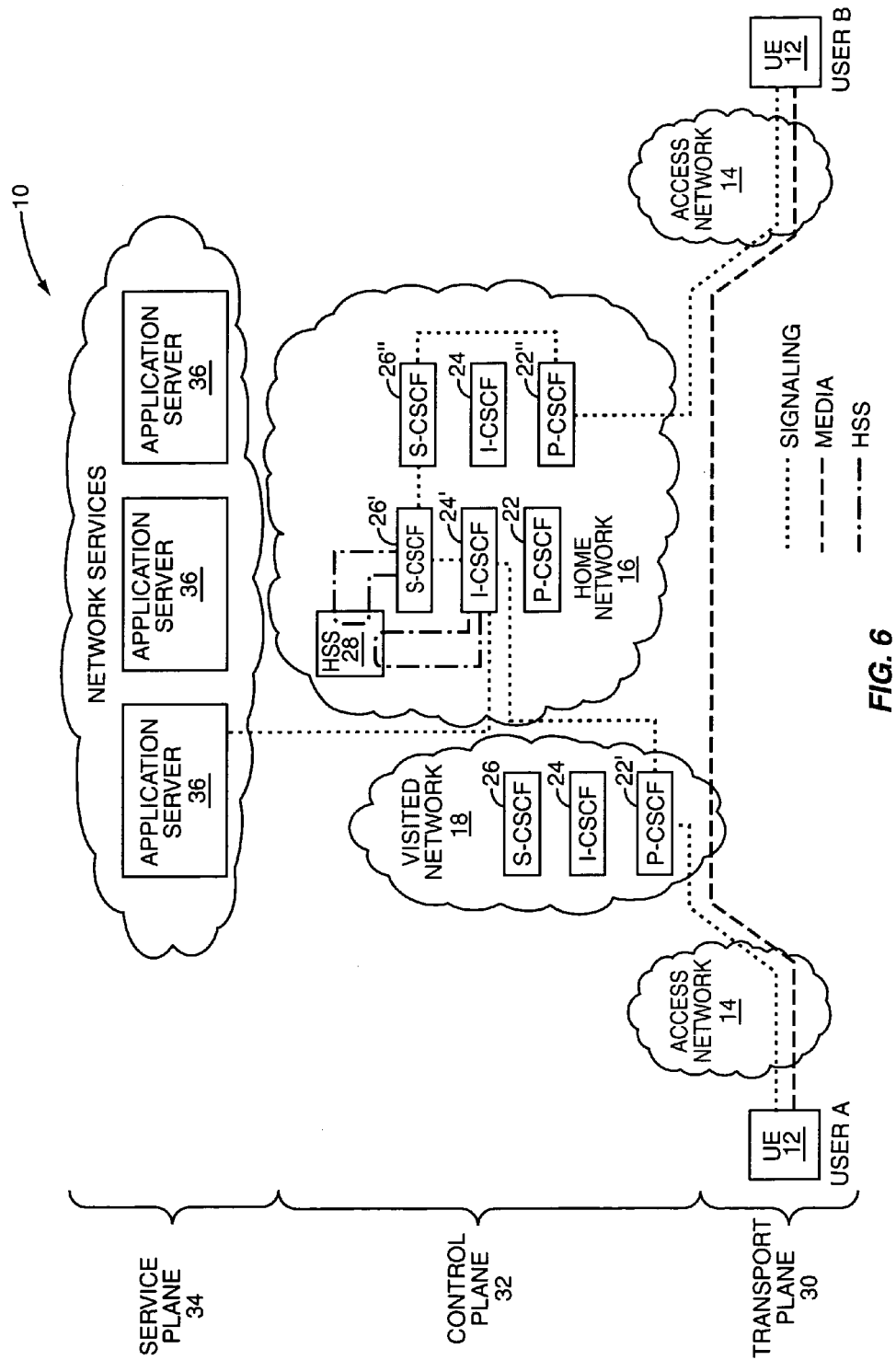
FIG. 6 is an IP multimedia subsystem illustrating the signaling and media paths for a session between two user elements according to the second embodiment of the present invention, wherein the session is initiated by the application server.

As illustrated in FIG. 6, an application server 36 may be configured to initiate a session between user A's user element 12 and user B's user element 12 on behalf of user A's user element 12. Assume user B's user element 12 is in the home network 16. As such, user A's user element 12 may be designated as the "originator" from the perspective of user B's user element 12. Instead of accessing the HSS 28, the application server 36 will create a session initiation message where user A's user element 12 appears as an originating user agent. In the session initiation message, the application server 36 will insert a route header pointing to the appropriate I-CSCF 24'. As noted above, the route header will identify the call signaling entities in the signaling path, and is modified as call signaling entities are added or removed from the call signaling path. In this example, the session initiation message will indicate that the application server 36 is the initiator of the session and that user A's user element 12 is the originator of the session.

Once the session initiation message is created, the application server 36 will route the session initiation message to the I-CSCF 24'. The I-CSCF 24' will access the HSS 28 to obtain the originating S-CSCF 26' associated with the "originator" of the session initiation message. In this instance, user A's user element 12 is effectively the originator of the session. The session initiation message is then routed to the originating S-CSCF 26', which will access the HSS 28 to identify the terminating S-CSCF 26" in the called network 20. The originating S-CSCF 26' will then route the session initiation message to the terminating S-CSCF 26". Upon reaching the S-CSCF 26" in the called network 20, the session initiation message is routed to user B's user element 12 via the P-CSCF 22" in the called network 20.

The application server 36 may also send a session initiation message to user A's user element 12 via the I-CSCF 24' and P-CSCF 22' to provide the information necessary to bring user A's user element 12 into the call signaling path such that the session can be established between the user elements 12. Notably, the originating S-CSCF 26' may be employed to engage user A's user element 12.

Figure 7A:
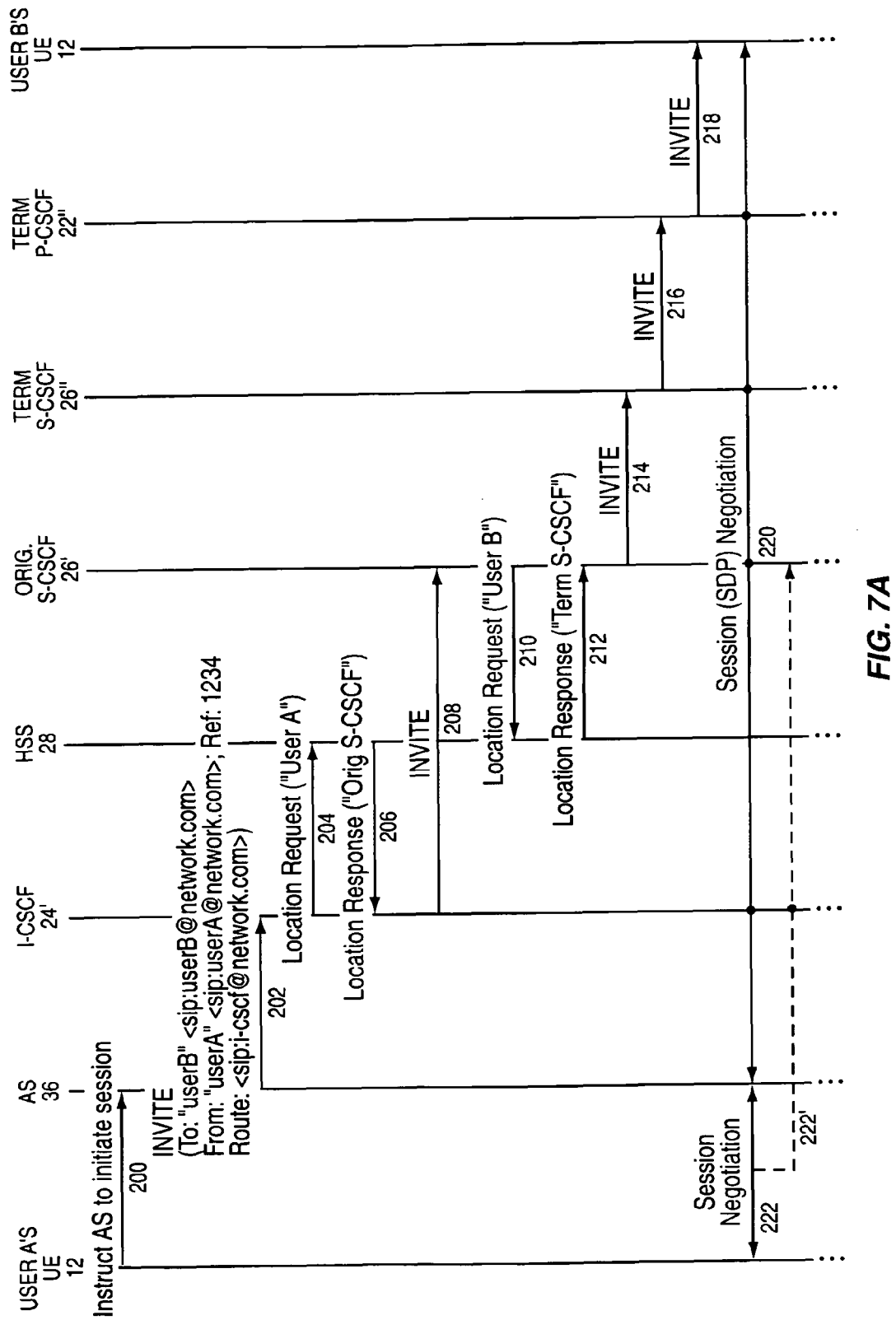
FIGS. 7A and 7B illustrate a communication flow diagram for establishing a session between two user elements according to second embodiment of the present invention, wherein the session is initiated by the application server.
Figure 7B:
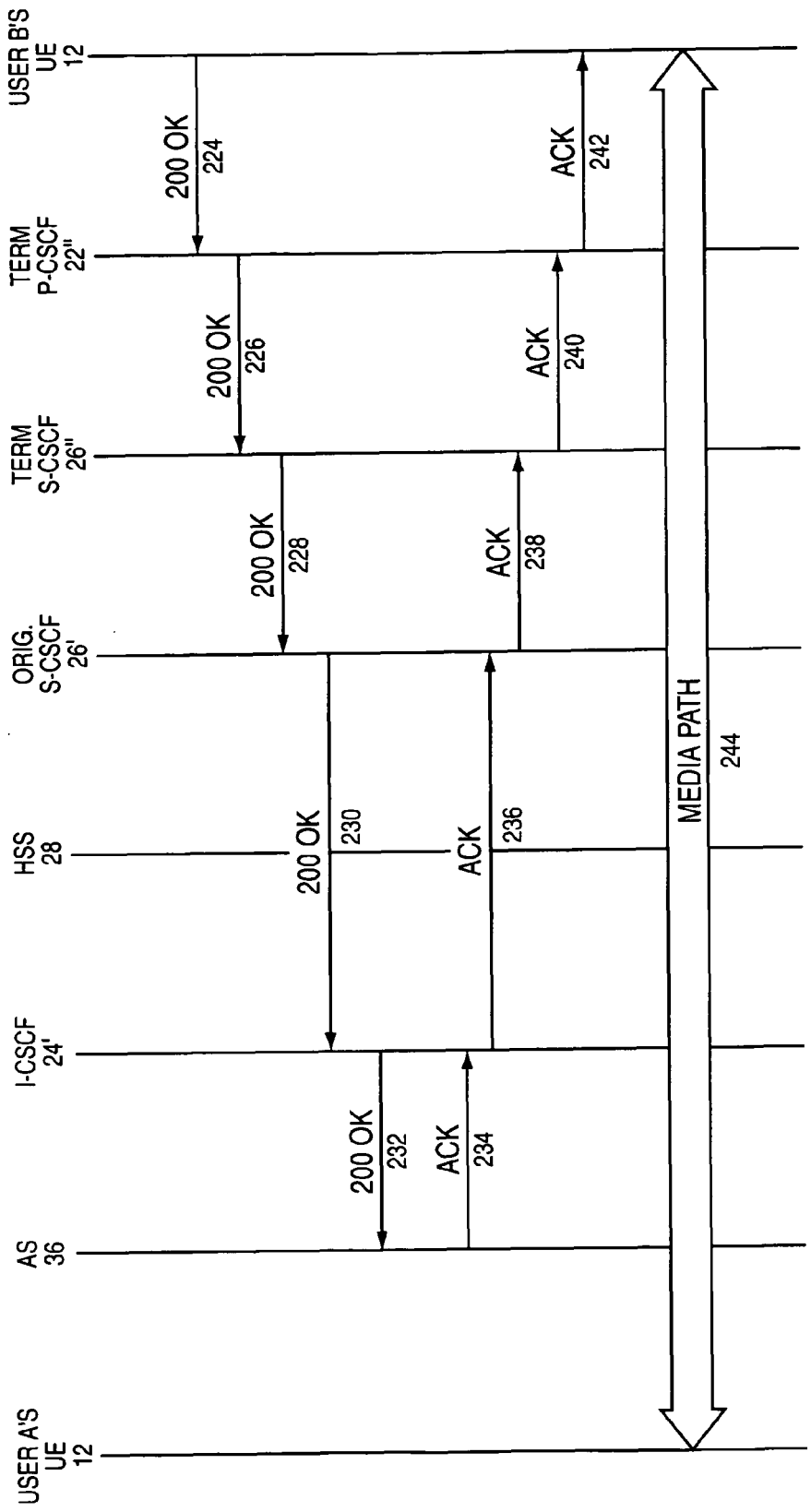

With reference to FIGS. 7A and 7B, a high-level communication flow is provided to illustrate how an application server 36 can initiate a session between user A's user element 12 and user B's user element 12 for the scenario of FIG. 6. Assume the session is a voice session, or call, provided in response to user A electing to initiate a call to user B while interacting with a voicemail system provided by application server 36. Assume the application server 36 is outside of the IMS domain.

In response to one or more available options, assume user A elects to initiate a call to user B's user element 12. As such, appropriate instructions are provided to the application server 36 from user A's user element 12 (step 200). The application server 36 will trigger initiation of the session between user A's user element 12 and user B's user element 12 in response to the instructions. The application server 36 will create a session initiation message in the form of a SIP Invite. The Invite identifies addresses of the originating element, the terminating endpoint, and the I-CSCF 24' to which the Invite should be directed. The originating element address corresponds to the address of user A's user element 12, "user A" <sip:userA@network.com>, and is provided in the "from" field. The terminating endpoint address corresponds to the address of user B's user element 12, "userB" <sip:userB@network.com>, and is provided in the "to" field. The I-CSCF's address, <sip:i-cscf@network.com>, is placed in the route header and is illustrated in the "route" field. The Invite may also include a reference number, 1234, for uniquely identifying the session.

Once created, the Invite is sent to the I-CSCF 24' (step 202), which will send a Location Request to the HSS 28 to identify the originating S-CSCF 26', which is associated with user A, to which the Invite should be routed (step 204). The HSS 28 will respond with a Location Answer, which identifies the originating S-CSCF 26' (step 206). The I-CSCF 24' will send the Invite to the originating S-CSCF 26' (step 208), which will send a Location Request to the HSS 28 to identify the terminating S-CSCF 26'serving user B's user element 12 (step 210). The HSS 28 will respond with a Location Answer identifying the terminating S-CSCF 26" (step 212). The originating S-CSCF 26' will invoke any desired application services from other application servers 36, add itself to the route header, and send the Invite to the terminating S-CSCF 26" (step 214).

The terminating S-CSCF 26" will invoke any desired application services from other application servers 36, add itself to the route header, and send the Invite to the P-CSCF 22" currently supporting user B's user element 12 (step 216). The P-CSCF 22" will send the Invite to user B's user element (step 218). At this point, the session is presented to user B's user element and standard session negotiation messages are exchanged between the application server 36 and user B's user element 12 (step 220). Further session negotiation will take place with user A's user element 12 to enable the user elements 12 of user A and user B to obtain each other's communication parameters (step 222). Session negotiation may be employed in the SDP of the SIP messages where communication parameters for the session message are effectively exchanged between the user A's user element 12 and user B's user element 12 via the application server 36 or one of the CSCFs in the signaling path (step 222').

After session negotiation, user B's user element 12 will send a 200 OK message to the P-CSCF 22" (step 224), which will send the 200 OK to the terminating S-CSCF 26" (step 226). The terminating S-CSCF 26" will send the 200 OK to the originating S-CSCF 26' (step 228). The originating S-CSCF 26' will send the 200 OK to the I-CSCF 24' (step 230), which will send the 200 OK to the application server 36 (step 232). In response, the application server 36 will send an acknowledgement (ACK) toward user B's user element 12 along the signaling path. The acknowledgement is forward through the I-CSCF 24', originating S-CSCF 26', terminating S-CSCF 26", and P-CSCF 22" to user B's user element 12 (steps 234 through 242). At this point, a media path for the voice session is established between user A's user element 12 and user B's user element 12 (step 244).

Figure 8:
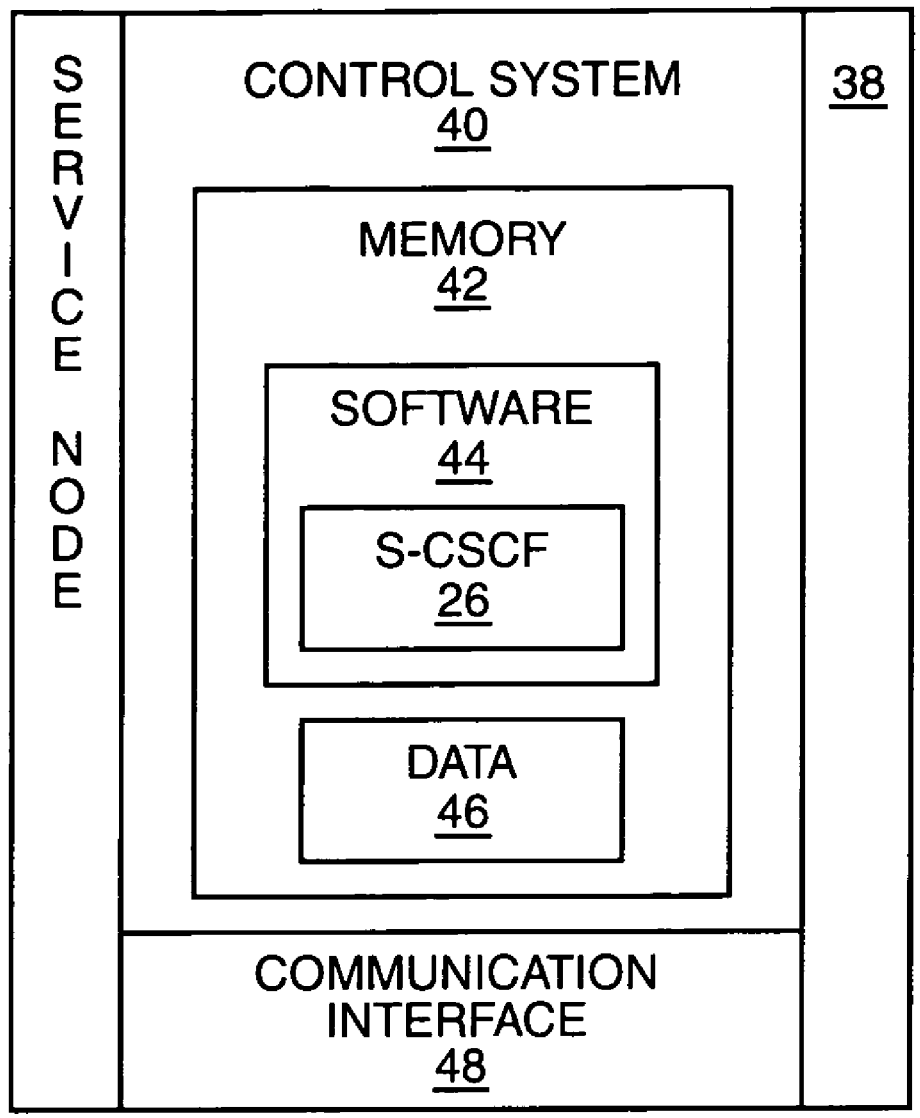
FIG. 8 illustrates a service node in which an S-CSCF may be implemented in whole or in part according to one embodiment of the present invention.
Figure 9:
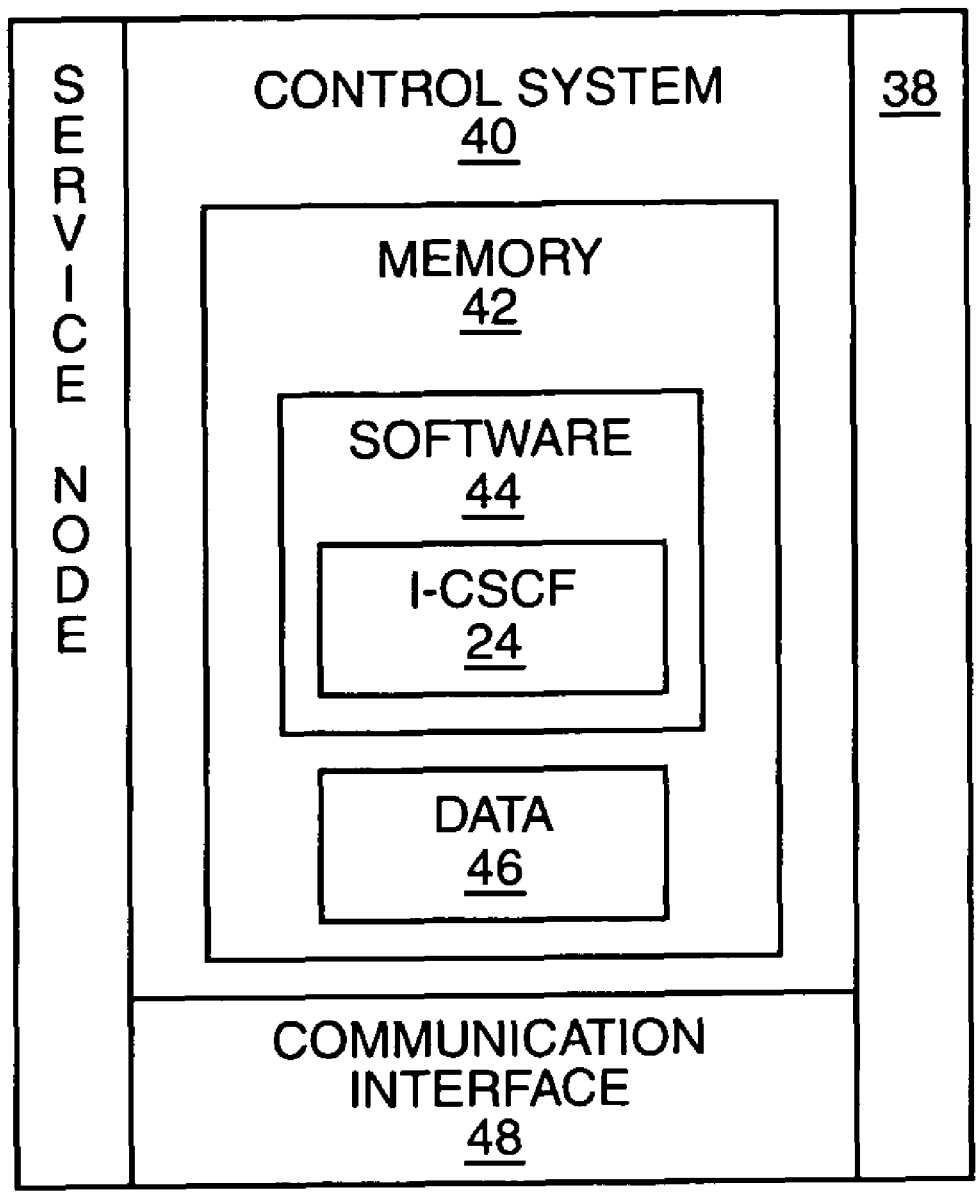
FIG. 9 illustrates a service node in which an I-CSCF may be implemented in whole or in part according to one embodiment of the present invention.

The S-CSCF 26 and the I-CSCF 24 may be implemented in a unified or distributed fashion among any number of service control entities, which may provide other signaling functions. These call control entities may be referred to as a service node 38, such as those depicted in FIGS. 8 and 9. As illustrated in FIG. 8, the service node 38 may include a control system 40 having sufficient memory 42 for the software 44 and data 46 to operate as described above. In particular, the software 44 may provide an S-CSCF 26 as well as any number of functions. The control system 40 will also be associated with a communication interface 48 to facilitate packet communications over the network supporting the service node 38. Similarly, the service node 38 of FIG. 9 may be configured such that the software 44 provides an I-CSCF 24.

Figure 10:
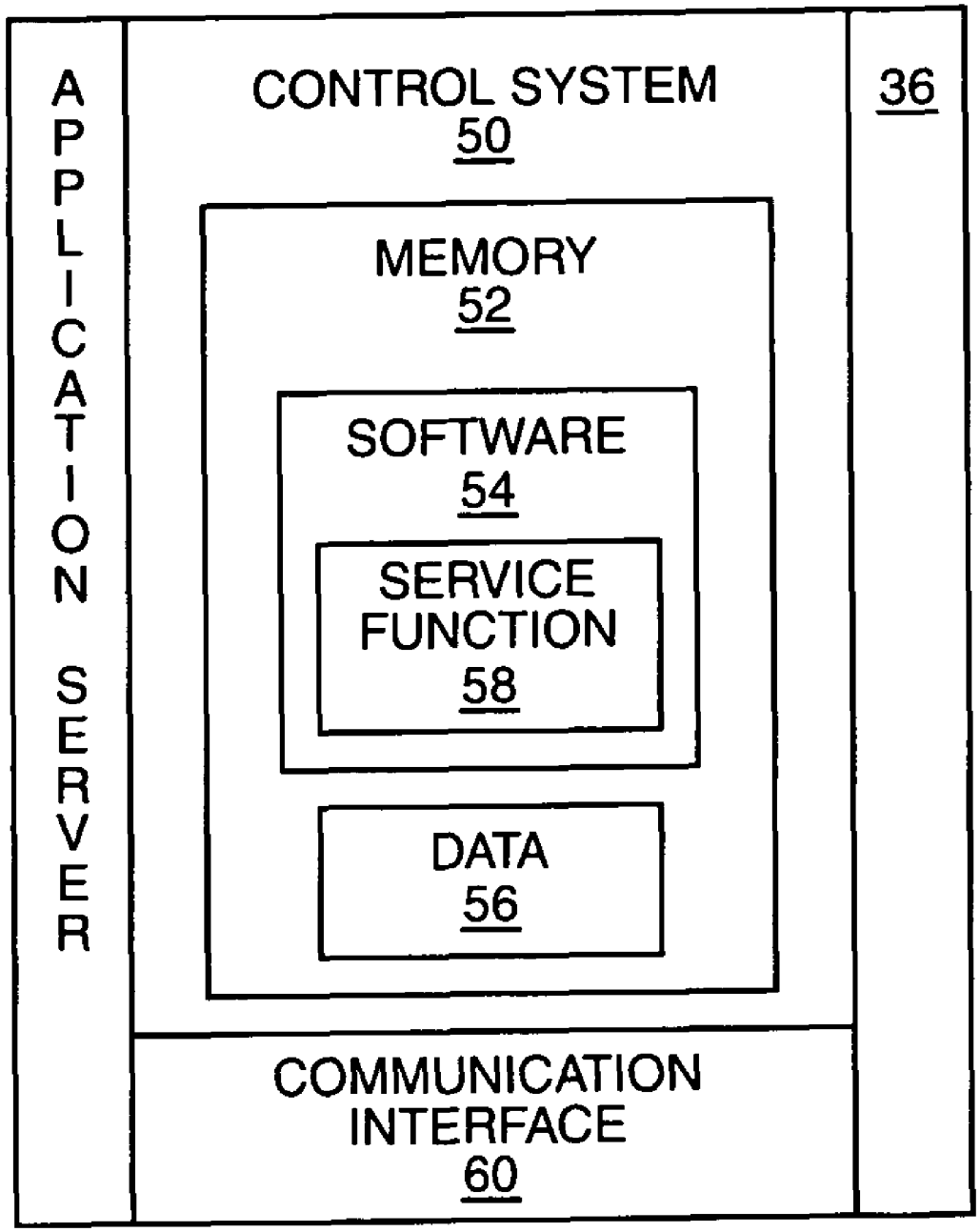
FIG. 10 illustrates an application server according to one embodiment of the present invention.

With reference to FIG. 10, a block representation of an application server 36 is provided. The application server 36 may include a control system 50 having sufficient memory 52 for the software 54 and data 56 to operate as described above. The software 54 provides a service function 58 capable of initiating sessions through the I-CSCFs 24 without interacting with the HSSs 28.

Those skilled in the art will recognize improvements and modifications to the preferred embodiments of the present invention. All such improvements and modifications are considered within the scope of the concepts disclosed herein and the claims that follow.

What is claimed is:

1. A method for providing an interrogating call/session control function, I-CSCF, in an Internet Protocol multimedia subsystem, IMS, comprising:
   at the I-CSCF, receiving directly from an application server a session initiation message configured to initiate a session through the IMS between a designated originating element and a terminating element;
   determining a first serving call/session control function, S-CSCF, to which the session initiation message should be routed; and
   from the I-CSCF, routing the session initiation message to the first S-CSCF.

2. The method of claim 1 wherein the first S-CSCF is determined based on the designated originating element.

3. The method of claim 2 wherein determining the first S-CSCF comprises:
   sending a request to identify the first S-CSCF to a home subscriber server; and
   receiving information identifying the first S-CSCF.

4. The method of claim 2 further comprising:
   at the first S-CSCF, receiving the session initiation message;
   determining a terminating S-CSCF associated with the terminating element; and
   from the first S-CSCF, routing the session initiation message to the terminating element to effect establishment of the session.

5. The method of claim 1 further comprising, at the I-CSCF, relaying session messages between the designated originating element and the terminating element.

6. The method of claim 1 wherein the designated originating element is the application server, the terminating element is a user element, and the session is established between the application server and the user element.

7. The method of claim 1 wherein the designated originating element is a first user element, the terminating element is a second user element, and the session is established between the first user element and the second user element.

8. The method of claim 1 wherein the application server is outside of the IMS.

9. The method of claim 1 wherein the I-CSCF is identified in route information provided in the session initiation message.

10. A method of initiating sessions through an Internet Protocol multimedia subsystem, IMS, from an application server comprising:
    at the application server, creating a session initiation message configured to initiate a session through the IMS between a designated originating element and a terminating element; and
    from the application server, sending the session initiation message directly to an interrogating call/session control function, I-CSCF, in the IMS to initiate the session.

11. The method of claim 10 wherein the I-CSCF is identified in route information provided in the session initiation message.

12. The method of claim 10 wherein the designated originating element is the application server, the terminating element is a user element, and the session is established between the application server and the user element.

13. The method of claim 10 wherein the designated originating element is a first user element, the terminating element is a second user element, and the session is established between the first user element and the second user element.

14. The method of claim 10 wherein the application server is outside of the IMS.

15. The method of claim 10 wherein the I-CSCF is adapted to determine a first serving call/session control function, S-CSCF, to which the session initiation message should be routed, and route the session initiation message to the first S-CSCF.

16. A service node providing an interrogating call/session control function, I-CSCF, in an Internet Protocol multimedia subsystem, IMS, comprising:
- at least one communication interface; and
- a control system associated with the at least one communication interface and adapted to:
  - at the I-CSCF, receive directly from an application server a session initiation message configured to initiate a session through the IMS between a designated originating element and a terminating element;
  - determine a first serving call/session control function, S-CSCF, to which the session initiation message should be routed; and
  - route the session initiation message to the first S-CSCF.

17. The service node of claim 16 wherein the first S-CSCF is determined based on the designated originating element.

18. The service node of claim 16 wherein the designated originating element is the application server, the terminating element is as user element, and the session is established between the application server and the user element.

19. The service node of claim 16 wherein the designated originating element is a first user element, the terminating element is a second user element, and the session is established between the first user element and the second user element.

20. The service node of claim 16 wherein the I-CSCF is identified in route information provided in the session initiation message.

* * * * *